United States Patent
Fäth et al.

(10) Patent No.: US 11,306,615 B2
(45) Date of Patent: Apr. 19, 2022

(54) ROTOR FOR A TURBOCHARGER

(71) Applicant: Vitesco Technologies GMBH, Hannover (DE)

(72) Inventors: Holger Fäth, Fußgönheim (DE); Thomas Hendel, Ebertsheim (DE)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 16/824,742

(22) Filed: Mar. 20, 2020

(65) Prior Publication Data

US 2020/0217221 A1  Jul. 9, 2020

Related U.S. Application Data

(63) Continuation of application No. PCT/EP2018/071406, filed on Aug. 7, 2018.

(30) Foreign Application Priority Data

Sep. 20, 2017 (DE) ...................... 10 2017 216 621.5

(51) Int. Cl.
  *F01D 25/18* (2006.01)
  *F01D 5/04* (2006.01)
  *F01D 25/16* (2006.01)
  *F16C 17/00* (2006.01)

(52) U.S. Cl.
  CPC ............ *F01D 25/183* (2013.01); *F01D 5/048* (2013.01); *F01D 25/16* (2013.01); *F16C 17/00* (2013.01); *F05D 2220/40* (2013.01); *F05D 2250/293* (2013.01); *F05D 2250/294* (2013.01)

(58) Field of Classification Search
  CPC ........ F01D 25/183; F01D 5/048; F01D 25/16; F16C 17/00; F05D 2220/40; F05D 2250/293; F05D 2250/294
  USPC ........................................................ 60/605.3
  See application file for complete search history.

(56) References Cited

U.S. PATENT DOCUMENTS

| | | | | | |
|---|---|---|---|---|---|
| 4,128,283 A | * | 12/1978 | Palmer | .................... | F16C 17/18 384/287 |
| 4,240,678 A | * | 12/1980 | Sarle | ....................... | F16C 33/10 384/369 |
| 4,370,106 A | * | 1/1983 | Lauterbach | ............. | F16C 21/00 417/407 |
| 4,389,052 A | * | 6/1983 | Shimizu | .............. | F16C 33/1025 277/346 |

(Continued)

FOREIGN PATENT DOCUMENTS

| DE | 2653505 A1 | 5/1977 |
|---|---|---|
| DE | 3005873 A1 | 9/1980 |

(Continued)

OTHER PUBLICATIONS

PCT International Search Report and Written Opinion, dated Oct. 16, 2018 for counterpart PCT application PCT/EP2018/071406.

(Continued)

*Primary Examiner* — J. Todd Newton, Esq.

(57) ABSTRACT

There is disclosed a rotor for a turbocharger, wherein the rotor has a rotor shaft, a carrier sleeve, a bearing collar and an oil diverting ring. The oil diverting ring is arranged on the carrier sleeve and is spaced apart from the rotor shaft in the radial direction by means of the carrier sleeve.

13 Claims, 7 Drawing Sheets

(56) References Cited

U.S. PATENT DOCUMENTS

| | | | | |
|---|---|---|---|---|
| 4,986,733 A * | 1/1991 | Fleury | ............... | F04D 29/284 |
| | | | | 415/230 |
| 9,638,244 B2 * | 5/2017 | Duecker-Schulz | ... | F16C 17/045 |
| 10,072,707 B2 * | 9/2018 | Futae | ............... | F16C 33/128 |
| 2014/0233873 A1 * | 8/2014 | Hayashi | ............... | F16C 17/047 |
| | | | | 384/123 |
| 2016/0348721 A1 * | 12/2016 | Futae | ............... | F16C 17/047 |

FOREIGN PATENT DOCUMENTS

| | | | |
|---|---|---|---|
| DE | 3008949 | A1 | 9/1980 |
| DE | 3021349 | A1 | 1/1981 |
| DE | 102011012867 | A1 | 9/2011 |
| DE | 10201224068 | A1 | 6/2014 |
| DE | 102015216319 | | 3/2017 |
| EP | 3112706 | A1 | 1/2017 |
| WO | 2012045531 | A1 | 4/2012 |

OTHER PUBLICATIONS

German Office Action, dated Aug. 9, 2018, for counterpart German patent application 10 2017 216 621.5.

\* cited by examiner

ROTOR FOR A TURBOCHARGER

CROSS REFERENCE TO RELATED APPLICATIONS

This application claims the benefit of PCT Application PCT/EP2018/071406, filed Aug. 7, 2018, which claims priority to German Application DE 10 2017 216 621.5, filed Sep. 20, 2017. The disclosures of the above applications are incorporated herein by reference.

FIELD OF INVENTION

The invention relates to a rotor for a turbocharger.

BACKGROUND

In turbochargers nowadays, a plurality of different components are used for axially mounting the rotor shaft and for sealing the rotor shaft in relation to the stator.

A first known rotor of a turbocharger is shown in FIG. 1. This rotor has a rotor shaft 10. The latter is guided through a bearing housing 13, which has a lubricating oil supply 14, a radial bearing 15a and an axial bearing 15b, and continues into a compressor housing. A compressor wheel 11 is fastened on the rotor shaft 10. In the transition region between the bearing housing 13 and the rear wall 12, the rotor shaft has a step 16 which serves as an axial stop.

Furthermore, a bearing collar 5, which is designed as an annular disk, is provided on the rotor shaft 10 in the direction of the rear wall 12. A spacer sleeve 6 is arranged adjacent to the bearing collar 5 in the direction of the rear wall 12. An oil diverting ring 2 adjoins the spacer sleeve 6 in the direction of the rear wall 12. A sealing bushing 1, into which sealing rings are inserted, is provided adjacent to the oil diverting ring.

A second known rotor of a turbocharger is shown in FIG. 2. This rotor also has a rotor shaft 10. The latter is guided through a bearing housing 13, which has a lubricating oil supply 14, a radial bearing 15a and an axial bearing 15b, and continues into a compressor housing. A compressor wheel 11 is fastened on the rotor shaft 10. In the transition region between the bearing housing 13 and the rear wall 12, said rotor shaft has a step 16 which serves as an axial stop.

Furthermore, a bearing collar 3, which is realized together with a spacer sleeve as a monolithically integral component, is provided on the rotor shaft 10 in the direction of the rear wall 12. An oil diverting ring 2 adjoins the component 3 in the direction of the rear wall 12. A sealing bushing 1 into which sealing rings are inserted is provided adjacent to the oil diverting ring.

A third known rotor of a turbocharger is shown in FIG. 3. This rotor also has a rotor shaft 10. The latter is guided through a bearing housing 13, which has a lubricating oil supply 14, a radial bearing 15a and an axial bearing 15b, and continues into a compressor housing. A compressor wheel 11 is fastened on the rotor shaft 10. In the transition region between the bearing housing 13 and the rear wall 12, the rotor shaft has a step 16 which serves as an axial stop.

Furthermore, a bearing collar 5, which is designed as a disk, is provided on the rotor shaft 10 in the direction of the rear wall 12. A single-part combination bushing 4 which combines the functions of a spacer sleeve, an oil diverting ring and a sealing bushing is arranged adjacent to the bearing collar 5 in the direction of the rear wall 12. Sealing rings are inserted into the sealing bushing.

During the assembly of these known rotors, the individual components have to be threaded onto the rotor shaft from the compressor side. After this threading of the individual components onto the rotor shaft, during the tightening of the components by means of a shaft nut, the rotor shaft bends because of geometrical deviations of the components from their ideal shape as regards the parallelism of the end surfaces of the components. This results in an increased initial imbalance of the entire rotor assembly, which also includes the compressor wheel and the turbine wheel. In addition, there is also the risk that, because of the geometrical inaccuracies of the components mentioned, the components are undesirably displaced during the operation of the turbocharger. This leads to a change in the imbalance which, in turn, leads to an increased loading of the bearings of the rotor shaft and to acoustic conspicuousness of the turbocharger.

To date, it has been attempted to highly accurately manufacture the end surfaces of the components in respect of parallelism and perpendicularity to the central bore in order to keep the bending of the shaft to a minimum during the tightening of the shaft nut and furthermore so that the components lie against one another better and the movements thereof with respect to one another and relative to the rotor shaft are minimized. However, highly accurate manufacturing of this kind involves high individual costs.

Another approach to solving the abovementioned problems of the prior art is to reduce the number of intersections. One example of this is the use of a combination bushing, as has been described above with reference to FIG. 3. However, a combination bushing of this type is, in turn, highly complicated to produce. The chip removal or the turning is highly time-consuming and material-consuming because of the large differences in diameters of the components. Furthermore, it is difficult and costly to provide the end surface of the run-on surface toward the axial bearing with the required high precision in respect of surface quality and surface shape. For example, the run-on surface for the axial bearing cannot be lapped and can be surface-treated (coated, hardened, embossed, etc.) only with difficulty without having a negative effect on the other surrounding regions of the respective component.

SUMMARY

It is as aspect of embodiments of the invention to provide a rotor for a turbocharger, in which the above-mentioned problems do not occur.

In the embodiments, a rotor for a turbocharger has a rotor shaft, a carrier sleeve, an oil diverting ring and a bearing collar, wherein the oil diverting ring is arranged on the carrier sleeve and is spaced apart from the rotor shaft in the radial direction.

According to one embodiment, the carrier sleeve is a sealing bushing, wherein the oil diverting ring is arranged on the sealing bushing. The oil diverting ring is pressed onto the sealing bushing.

According to one embodiment, the sealing bushing has a step, onto which the oil diverting ring is pressed. According to a development of this embodiment, a bearing collar is furthermore arranged on the step of the sealing bushing.

According to another embodiment, a bearing collar is arranged adjacent to the sealing bushing in the axial direction of the rotor shaft.

According to a further embodiment, the sealing bushing has a further step, on which a bearing collar is arranged.

The bearing collar of the rotor may be designed as an annular disk.

According to another embodiment, a sealing bushing is arranged on the carrier sleeve. An advantageous development of this other embodiment is that the oil diverting ring is arranged on the carrier sleeve adjacent to the sealing bushing in the axial direction of the rotor shaft.

According to one embodiment, a bearing collar which is spaced apart from the sealing bushing is arranged on the carrier sleeve.

A further embodiment includes shaft sealing rings arranged on the carrier sleeve. A development of this further embodiment is the oil diverting ring is also arranged on the carrier sleeve. The oil diverting ring may be contacted here by one of the shaft sealing rings. Furthermore, a bearing collar which is spaced apart from the oil diverting ring may be arranged on the carrier sleeve. Alternatively thereto, the bearing collar may be arranged on the rotor shaft adjacent to the carrier sleeve.

The reduction in the number of components connected directly to the rotor shaft within the shaft assembly makes use of the advantage of the reduction in the number of intersections. First of all, bending of the rotor shaft during the installation and the tightening of the shaft nut is reduced. Furthermore, movements of the individual components of the rotor with respect to one another and relative to the rotor shaft during operation of the rotor are minimized.

A further advantage is that the sealing bushing may be produced with a significantly lower chip removal volume. Production by means of another method, for example by means of grinding or compressing and subsequent re-grinding, is also simplified.

A further advantage is that the bearing collar serving as a run-on point for the axial bearing may firstly be produced cost-effectively with great precision, i.e. with only small deviations in shape and with a machining operation required specially for the use as a run-on disk for the axial bearing. Furthermore, the material for the bearing collar may be different from the material of the sealing bushing. In this case too, the functionality of the axial mounting may be optimized or otherwise improved by a targeted coordination of the material for the bearing collar. It is also possible to harden the bearing collar separately or to treat the surface thereof in some other way, for example to coat or to emboss the surface or to introduce microstructures therein. Furthermore, it is possible to harden the oil diverting ring separately or to treat the surface thereof in some other way, for example to coat or to emboss the surface or to introduce microstructures therein.

Different geometries of the oil diverting ring may be provided during use of the same sealing bushing.

Installation of the piston ring is possible from both sides and is therefore simplified.

The individual components of the shaft assembly may be connected to one another in a force-fitting, form-fitting or integrally bonded manner, including pressed, soldered, welded, adhesive bonded, riveted or screwed to one another.

BRIEF DESCRIPTION OF THE DRAWINGS

Example embodiments for the invention will be explained in more detail below with reference to FIGS. 4 to 13. In the figures.

DETAILED DESCRIPTION

In the embodiments of the present invention, a rotor for a turbocharger has a rotor shaft, a carrier sleeve, an oil diverting ring and a bearing collar, wherein the oil diverting ring is arranged on the carrier sleeve and is spaced apart from the rotor shaft in the radial direction.

Figure 1:
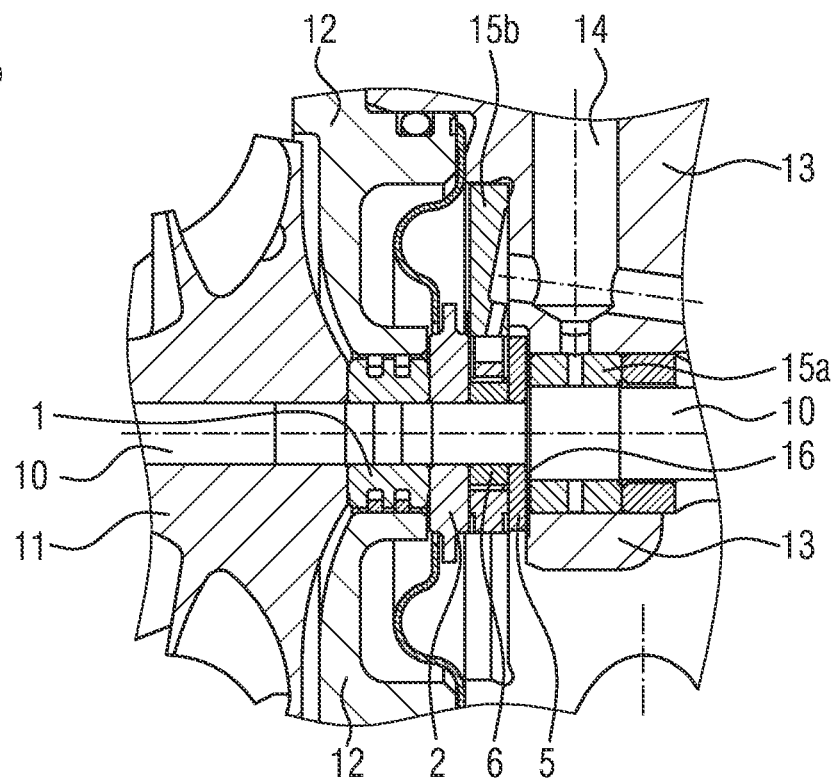
FIG. 1 shows a sectional illustration of a known rotor of a turbocharger.
Figure 2:
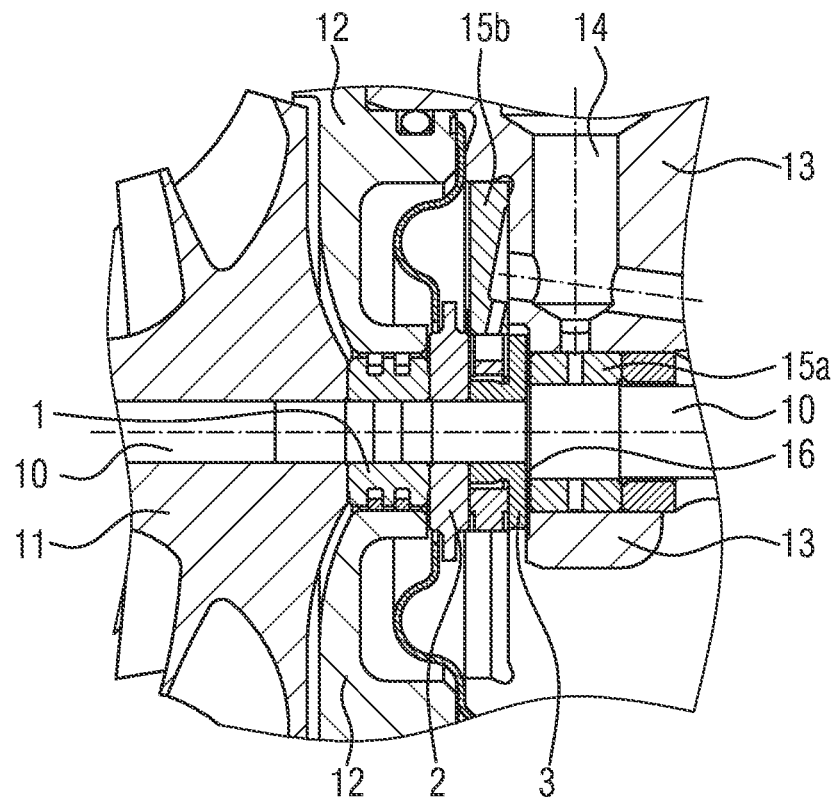
FIG. 2 shows a sectional illustration of another known rotor of a turbocharger.
Figure 3:
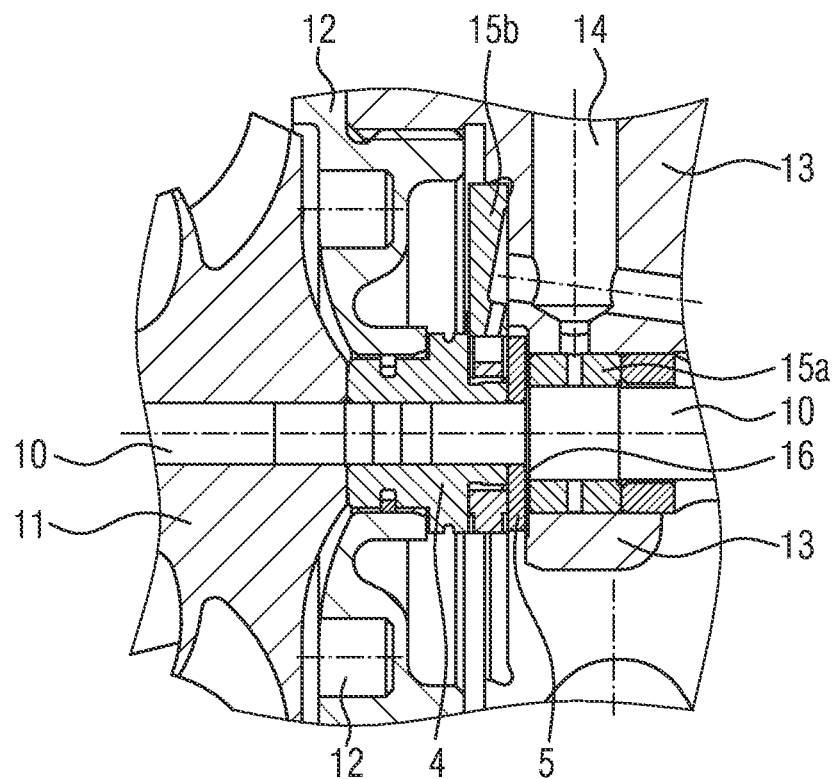
FIG. 3 shows a sectional illustration of yet another known rotor of a turbocharger.
Figure 4:
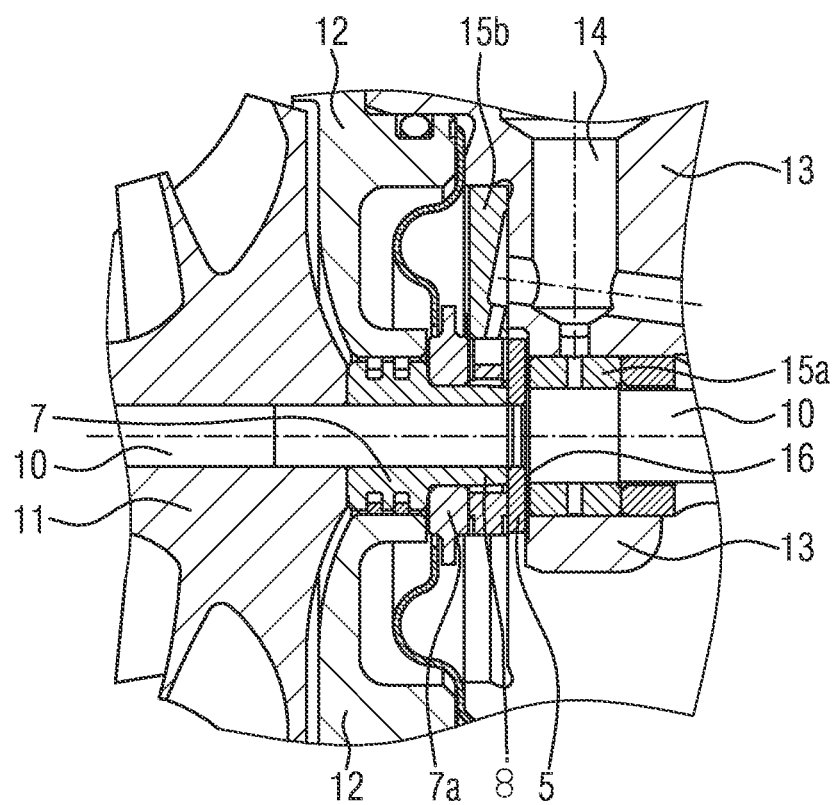
FIG. 4 shows a sectional illustration for explaining a first example embodiment of the invention.

FIG. 4 shows a sectional illustration for explaining a first example embodiment.

The rotor shown in FIG. 4 has a rotor shaft 10. The latter is guided through a bearing housing 13, which has a lubricating oil supply 14, a radial bearing 15a and an axial bearing 15b, and continues into a compressor housing. A compressor wheel 11 is fastened on the rotor shaft 10. In the transition region between the bearing housing 13 and the rear wall 12, the rotor shaft has a step 16 which serves as an axial stop.

Furthermore, a bearing collar 5 which is configured as an annular disk is provided on the rotor shaft 10 in the direction of the rear wall 12. A carrier sleeve which is realized as a sealing bushing 7 is arranged adjacent to the bearing collar 5 in the direction of the rear wall 12. An oil diverting ring 7a is arranged on the sealing bushing 7, into which sealing rings are inserted, the oil diverting ring being pressed onto a step of the sealing bushing 7. The oil diverting ring 7a is spaced apart from the rotor shaft 10 by the sealing bushing and consequently is not in direct contact with the rotor shaft 10. The number of components which are directly contacted by the rotor shaft is thereby reduced. The advantage of this reduction in the number of intersections is that, during the installation of the rotor, when the shaft nut is tightened, the bending of the rotor shaft is reduced and in that movements of the components of the rotor assembly relative to one another and relative to the rotor shaft during operation of the turbocharger are reduced.

Figure 5:
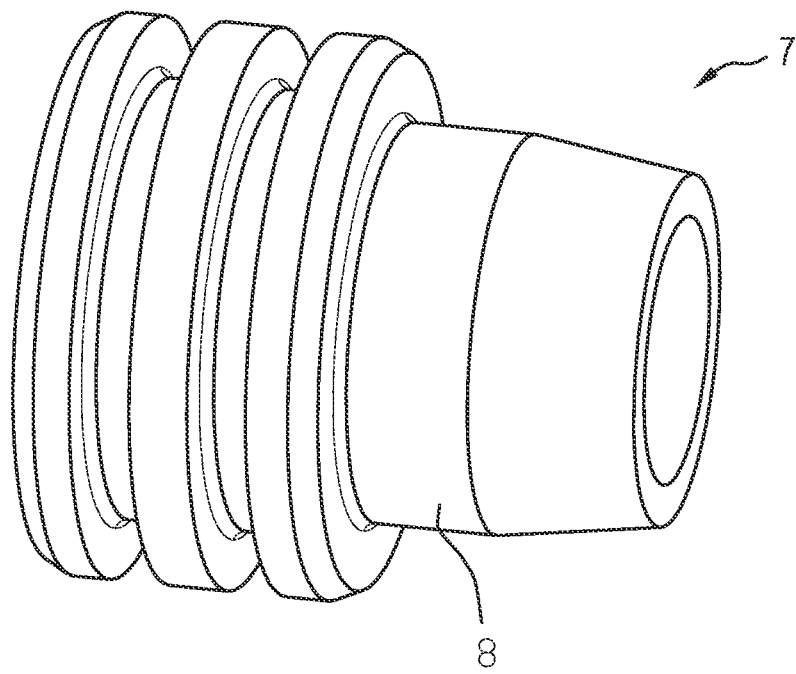
FIG. 5 shows a perspective illustration of a sealing bushing.

FIG. 5 shows a perspective illustration of the sealing bushing 7 illustrated in FIG. 4. The sealing bushing has annularly formed widened portions which extend radially outward and form receptacles for one or more annular sealing elements, for example piston rings. A receiving step for the oil diverting ring 7a is provided adjacent to the sealing element receptacles in the axial direction. The outside diameter of the sealing bushing is constant in the region of the receiving step. A bearing-housing-side end region of the sealing bushing, in which end region the outside diameter of the sealing bushing is continuously reduced, adjoins the receiving step for the oil diverting ring. This facilitates the installation. This diameter may also be constant.

Figure 6:
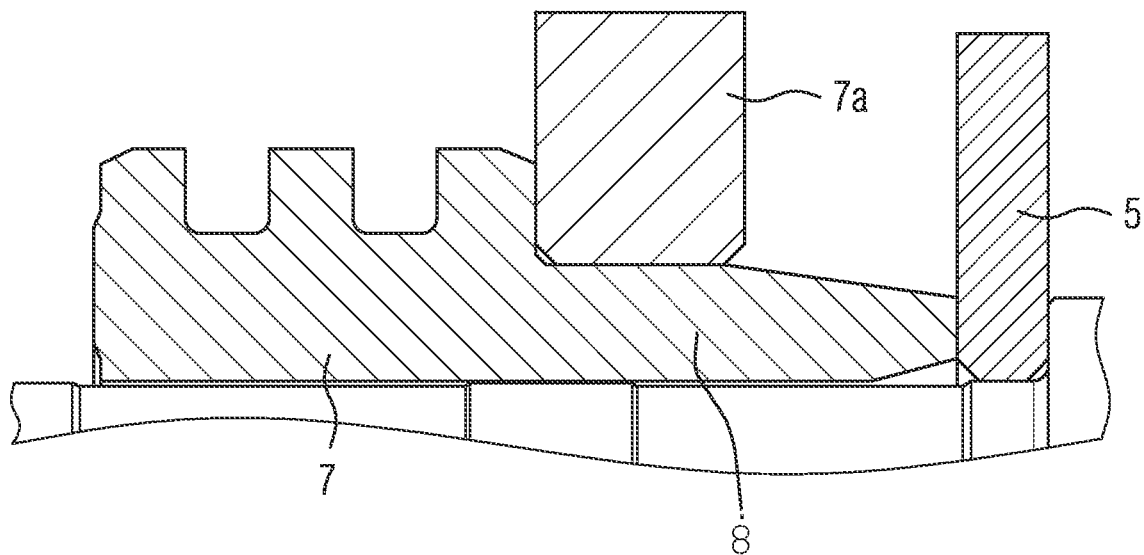
FIG. 6 shows an illustration of a sealing bushing with an oil diverting ring pressed thereon.

FIG. 6 shows an illustration of the sealing bushing 7 with the oil diverting ring 7a pressed thereon and with the bearing collar 5 which is adjacent to the sealing bushing 7 in the axial direction.

Figure 7:
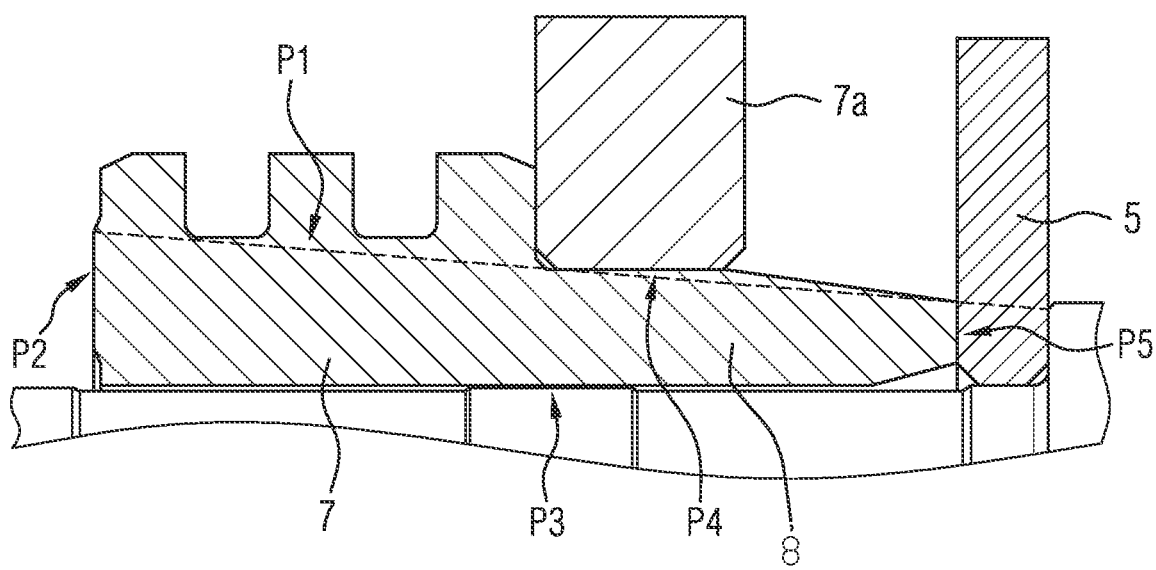
FIG. 7 shows a further illustration of a sealing bushing with an oil diverting ring pressed thereon.

FIG. 7 shows a further illustration of the sealing bushing 7 with the oil diverting ring 7a pressed thereon and with the bearing collar 5 which is adjacent to the sealing bushing in the axial direction. The arrow P1 illustrates a force flux cone, the arrow P2 a reduction in the contact surface in order to minimize angle errors, the arrow P3 a loose fit, the arrow P4 an interference fit and the arrow P5 a reduction in the contact surface in order to minimize angle errors.

Figure 8:
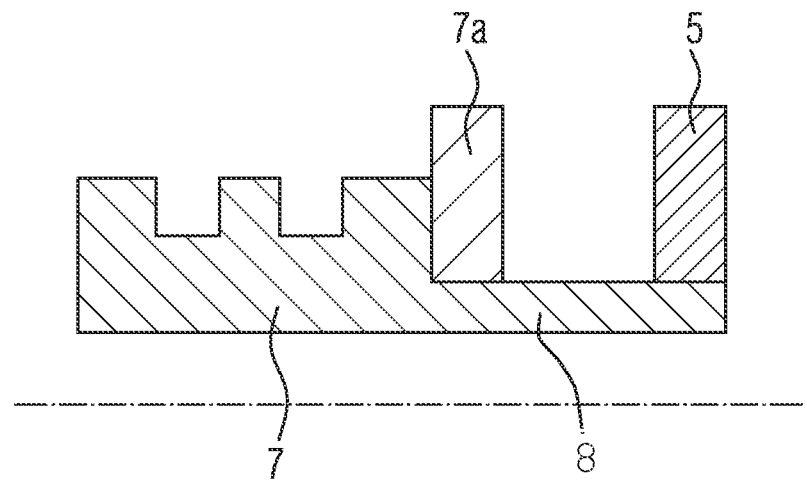
FIG. 8 shows a sectional illustration for explaining a second example embodiment of the invention.

FIG. 8 shows a sectional illustration for explaining a second example embodiment.

In this second example embodiment, as in the first example embodiment, the carrier sleeve is realized as a sealing bushing 7 which has one or more receiving regions or receiving grooves for receiving one piston ring each. Furthermore, in this example embodiment too, an oil diverting ring 7a is arranged on the sealing bushing 7, is pressed onto the sealing bushing, and is spaced apart from the rotor shaft by means of the sealing bushing. Furthermore, in this second example embodiment, the bearing collar 5 is also arranged on the sealing bushing 7 and is therefore spaced apart from the rotor shaft by means of the sealing bushing. In this second example embodiment, the oil diverting ring 7a and the bearing collar 5 are positioned on the same receiving step of the sealing bushing 7. The outside diameter of the sealing bushing is approximately constant throughout the region of the receiving step. A cone over the entire length or over part of the receiving step is also conceivable here.

Figure 9:
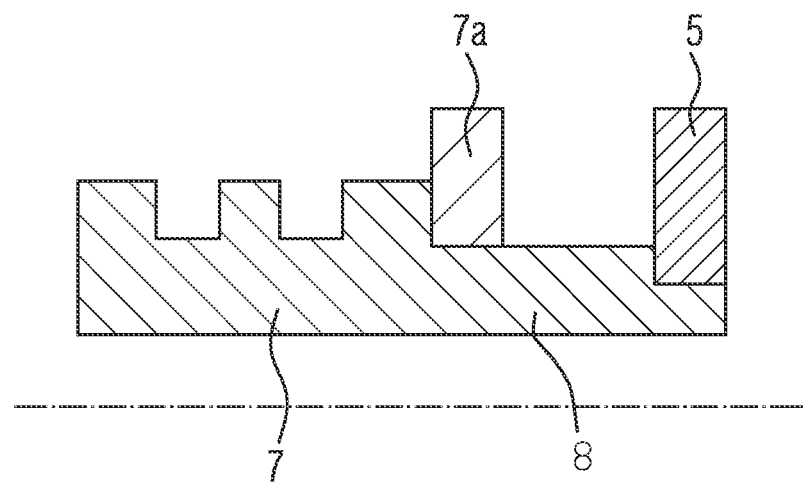
FIG. 9 shows a sectional illustration for explaining a third example embodiment of the invention.

FIG. 9 shows a sectional illustration of a third example embodiment. This third example embodiment differs from the second example embodiment shown in FIG. 8 only in that the sealing bushing 7 has a second receiving step on which the bearing collar 5 is positioned.

Figure 10:
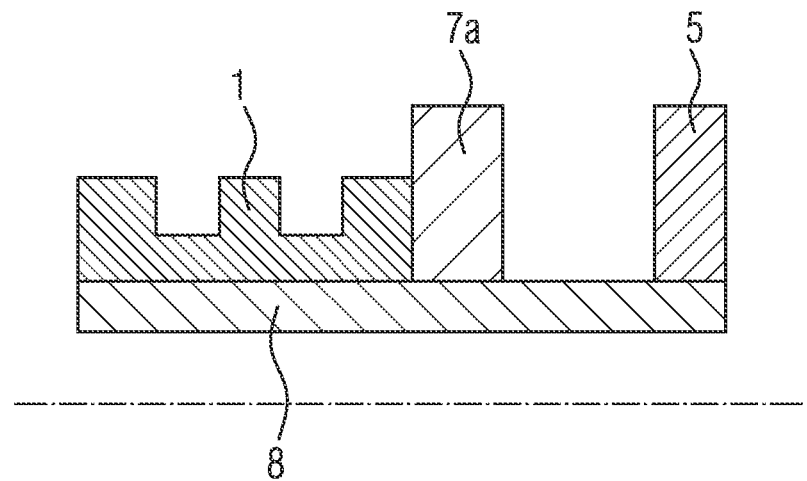
FIG. 10 shows a sectional illustration for explaining a fourth example embodiment of the invention.

FIG. 10 shows a sectional illustration of a fourth example embodiment. This differs from the example embodiments described above in that the sealing bushing 1 does not form the carrier sleeve, but rather is arranged on the carrier sleeve 8 and is therefore spaced apart from the rotor shaft by means of the carrier sleeve. The sealing bushing 1 has receiving grooves in a conventional manner for sealing rings. An oil diverting ring 7a is positioned on the carrier sleeve 8 adjacent to the sealing bushing 1. In the example embodiment shown, the oil diverting ring makes contact directly with the sealing bushing 1. Furthermore, a bearing collar 5 is arranged on the carrier sleeve 8. The bearing collar is also consequently spaced apart from the rotor shaft by means of the carrier sleeve 8. In this example embodiment, only the carrier sleeve 8 is consequently in direct contact with the rotor shaft.

Figure 11:
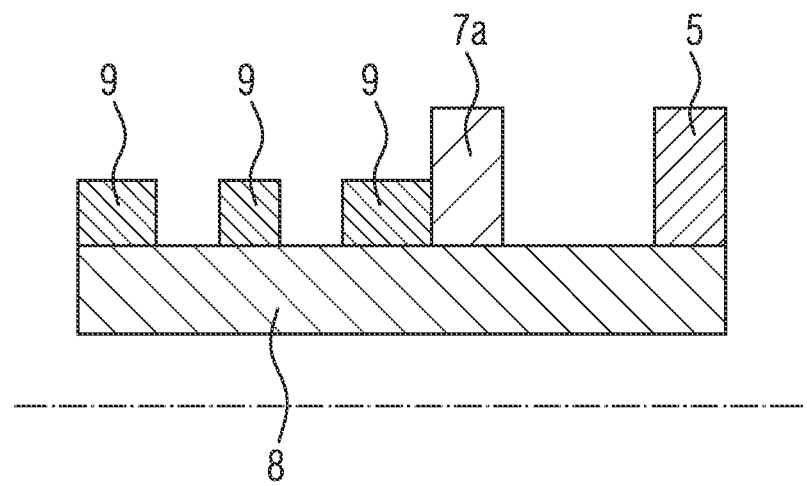
FIG. 11 shows a sectional illustration for explaining a fifth example embodiment of the invention.

FIG. 11 shows a sectional illustration of a fifth example embodiment. This example embodiment differs from the example embodiment shown in FIG. 10 in that, instead of a sealing bushing, a total of two or more run-on disks 9 for shaft sealing rings are positioned on the carrier sleeve 8. Furthermore, an oil diverting ring 7a is positioned on the carrier sleeve 8 adjacent to the run-on disk 9 which is on the right in FIG. 11. In the example embodiment shown, the oil diverting ring makes contact directly with the right-hand run-on disk 9. Furthermore, a bearing collar 5 is arranged on the carrier sleeve 8. The bearing collar is also consequently spaced apart from the rotor shaft by means of the carrier sleeve 8. In this example embodiment too, only the carrier sleeve 8 is consequently in direct contact with the rotor shaft.

Figure 12:
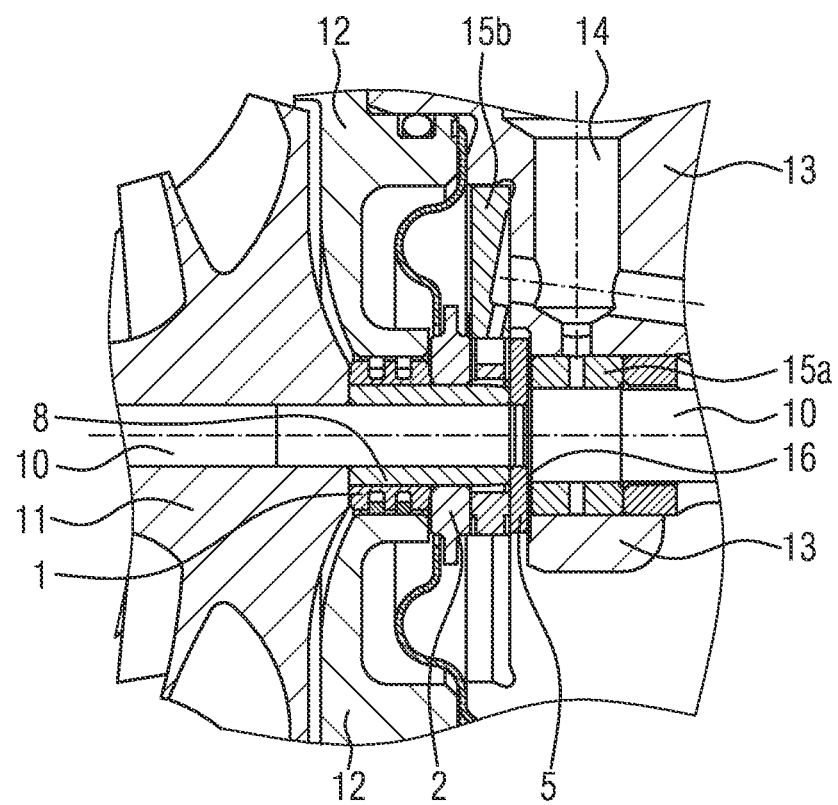
FIG. 12 shows a sectional illustration for explaining a sixth example embodiment of the invention.

FIG. 12 shows a sectional illustration of a sixth example embodiment.

The rotor shown in FIG. 12 has a rotor shaft 10. The latter is guided through a bearing housing 13, which has a lubricating oil supply 14, a radial bearing 15a and an axial bearing 15b, and continues into a compressor housing. A compressor wheel 11 is fastened on the rotor shaft 10. In the transition region between the bearing housing 13 and the rear wall 12, the rotor shaft has a step 16 which serves as an axial stop.

Furthermore, a bearing collar 5 which is configured as an annular disk is provided on the rotor shaft 10 in the direction of the compressor housing 12. A carrier sleeve 8 is arranged adjacent to the bearing collar 5 in the direction of the compressor housing. A sealing bushing 1 into which sealing rings are inserted is arranged on the carrier sleeve 8. The sealing bushing 1 is consequently spaced apart from the rotor shaft by means of the carrier sleeve 8. Furthermore, an oil diverting ring 7a is arranged on the carrier sleeve 8 adjacent to the sealing bushing 1. The oil diverting ring is positioned on a step of the carrier sleeve 8. The oil diverting ring 7a is spaced apart from the rotor shaft 10 by the carrier sleeve 8 and consequently is not in direct contact with the rotor shaft 10. The number of components which are directly contacted by the rotor shaft is thereby reduced to two. The advantage of this reduction in the number of intersections in this example embodiment too is that, during the installation of the rotor, when the shaft nut is tightened, the bending of the rotor shaft is reduced and in that movements of the components of the rotor assembly relative to one another during operation of the turbocharger are reduced.

Figure 13:
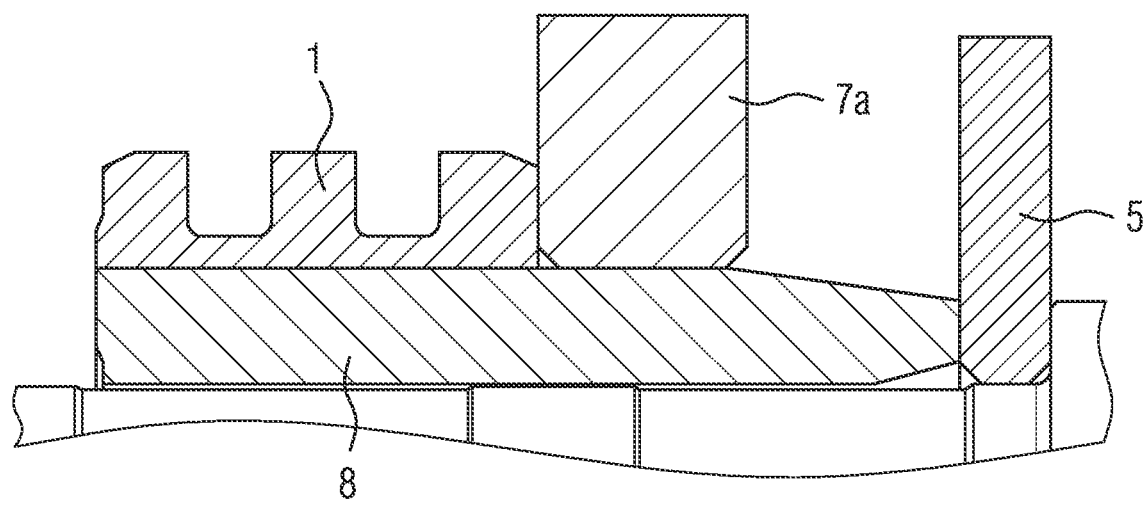
FIG. 13 shows a further illustration of the example embodiment shown in FIG. 12.

FIG. 13 shows a further illustration of the example embodiment which is shown in FIG. 12 and in which the carrier sleeve 8, the sealing bushing 1, the oil diverting ring 7a and the bearing collar 5 which is positioned next to the carrier sleeve 8 are illustrated in enlarged form.

In all of the example embodiments described above, the number of components directly contacted by the rotor shaft is kept small. A carrier sleeve which is directly contacted by the rotor shaft is in each case provided. The carrier sleeve may be a sealing bushing on which an oil diverting ring is positioned. Furthermore, a bearing collar is either likewise positioned on the sealing bushing or is arranged next to the latter. Alternatively thereto, the sealing bushing may also be arranged on the carrier sleeve. In this alternative, the oil diverting ring is likewise arranged on the carrier sleeve. Furthermore, in this alternative too, the bearing collar is either likewise arranged on the carrier sleeve or is positioned next to the latter in the axial direction.

In all of the above-described example embodiments, the oil diverting ring 7a may have a surface which is embossed, coated, hardened or changed in its microstructure.

Furthermore, the bearing collar may also have a surface which is embossed, coated, hardened or changed in its microstructure.

Furthermore, the carrier sleeve may be produced by forming and by an additional grinding process.

The invention claimed is:

1. A rotor for a turbocharger, the rotor comprising:
   a rotor shaft;
   a carrier sleeve;
   a sealing bushing, the sealing bushing arranged on the carrier sleeve;

an oil diverting ring;

a bearing collar; and wherein the oil diverting ring, as a separate component, is arranged adjacent to the sealing bushing in an axial direction on the carrier sleeve and is spaced apart from the rotor shaft in a radial direction thereof;

wherein the bearing collar, as a separate component, is arranged on the carrier sleeve spaced apart from the oil diverting ring such that an axial bearing is located in between the bearing collar and the oil diverting ring.

2. The rotor of claim 1, wherein the carrier sleeve is formed as part of the sealing bushing and the oil diverting ring is arranged on the carrier sleeve of the sealing bushing.

3. The rotor of claim 2, wherein the oil diverting ring is pressed, soldered, welded, adhesively bonded, riveted or screwed to the sealing bushing.

4. The rotor of claim 3, wherein the sealing bushing provides a step on the carrier sleeve, onto which the oil diverting ring is fitted.

5. The rotor of claim 4, wherein the bearing collar is also arranged on the step provided by the sealing bushing.

6. The rotor of claim 4, wherein the bearing collar is arranged on the same step of the carrier sleeve as the oil diverting ring or is arranged on a further step of the carrier sleeve.

7. The rotor of claim 5, wherein the bearing collar comprises an annular disk.

8. The rotor of claim 1, further comprising shaft sealing rings arranged on the carrier sleeve, forming the sealing bushing.

9. The rotor of claim 8, wherein the oil diverting ring is in contact with one of the shaft sealing rings.

10. The rotor of claim 1, wherein the oil diverting ring has a surface which is embossed, coated, or hardened.

11. The rotor of claim 1, wherein the bearing collar has a surface which is embossed, coated, or hardened.

12. The rotor of claim 1, wherein the carrier sleeve is produced using a forming process and an additional grinding process.

13. The rotor of claim 1, wherein the carrier sleeve has at least a partially conical outer contour.

* * * * *